United States Patent Office 2,999,031
Patented Sept. 5, 1961

2,999,031
LIQUID LAUNDRY STARCH
Walter J. Katzbeck, Oak Park, Ill., assignor to Corn Products Company, a corporation of Delaware
No Drawing. Filed Sept. 5, 1957, Ser. No. 682,098
3 Claims. (Cl. 106—213)

This invention relates to a new liquid laundry starch product which will not cause fabric damage when used and which will remain stable on storage over a wide temperature range, including below normal temperatures.

Liquid laundry starches have been known for a number of years. Most liquid laundry starch products on the market consist principally of a starch which has been precooked and gelatinized in water. These products also contain electrolytes, such as sodium chloride, sodium sulfate, in amounts varying from about 2 to about 6 percent of the total weight of the product to lower the freezing point to permit storage at subfreezing temperatures. In addition, liquid laundry starches contain, in minor amounts coloring agents to eliminate the necessity for the use of bluing in the wash; germicidal agents to keep the liquid product stable toward bacterial or mold attack; perfumes; optical bleaching agents and waxes or wax type materials to improve ironing ease and to make clothing feel less harsh and more smooth to the touch.

Presently available liquid laundry starches possess certain disadvantages. The salts used therein, such as sodium chloride, due to electrolytic action when in contact with bimetallic elements, such as the common Talon fasteners in clothing, cause fabric weakening and, ultimately, holes in clothing.

The temperature of storage of presently available liquid starches is critical since, if the temperature of storage is too low, the product will form gels or lumps making it unusable to the consumer. Freight costs for transporting cold-sensitive aqueous starch product in below-freezing weather are expensive since heated trucks or railroad cars are required to prevent gelation of the product.

To overcome these several disadvantages and retain the desirable features of a liquid laundry starch product, it would be an obvious improvement to manufacture a starch product which will not cause fabric damage nor form gels and which can be stored in below normal temperature areas and may even be shipped in below-freezing weather without resorting to expensive area-heating means.

Prior to my discovery no known commercially available liquid laundry starch product has been entirely satisfactory in all these respects. Liquid starch products consisting of only cooked starch in water plus a perservative do not remain stable at below normal temperatures, since either gelation of the starch or phase separation and sedimentation of the starch occurs. The addition of substantial amounts of electrolytes appreciably lowers the freezing point of liquid starch products; hence, salts are added chiefly to enable the product to be stored for a limited time in subfreezing temperature areas. However, with liquid starch products made by prior art processes, it is not necessary actually to freeze them in order to transform them into gelled, nonreconstitutable masses on warming to normal temperature; even when these liquid products are stored at subnormal temperatures above freezing, gelation of the product into a nonusable mass is accentuated. The addition of salts to liquid products, when shipped or stored in cold weather, prevents to only a limited extent the gelation of the starch in the product. Moreover, such products, containing highly ionizable salts, have the disadvantage to the consumer of causing fabric damage as was pointed out above. Some liquid starch products contain, in addition to the ingredients mentioned above, starch stabilizing agents, such as pine oil and other materials which, in conjunction with salts, give greater but still not absolute protection to the starch stored at low temperature.

I have made the unexpected discovery that a liquid starch product prepared by gelatinizing starch in water containing borax or sodium pentaborate followed by the addition of coloring agents, perfumes, germicidal agents, ironing aids, etc., does not cause fabric damage and may be stored indefinitely at temperatures below normal or may be actually frozen solid and then thawed without causing starch gelation to occur.

Any type of starch, e.g., corn, wheat, grain sorghum, waxy grain sorghum, waxy maize or tapioca or mixtures or modifications thereof may be employed in the process of this invention. However, the extent of starch modification desirable depends to some extent upon the type of starch used. Thus, less modification may be used when tapioca or waxy grain sorghum starch is employed than when corn starch is used.

It has been found that liquid starch products with optimal properties can be obtained from starches which are substantially unmodified and from those which have been modified but not beyond the point where the paste viscosity by Scott test exceeds about 50 seconds per 100 ml. using 75 grams of starch in 280 ml. of water. When employing our preferred procedure, the preferred range is from a paste viscosity by Scott test of about 40 seconds per 100 ml. using 20 grams of starch in 280 ml. of water to about 50 seconds per 100 ml. using 75 grams of starch in 280 ml. of water when modified corn starch is used and from a paste viscosity by Scott test of about 100 seconds per 100 ml. using 15 grams of starch in 280 ml. of water to about 40 seconds per 100 ml. using 28.35 grams of starch in 280 ml. of water when modified waxy grain sorghum starch is used.

Starch may be modified in any suitable manner by procedures well known in the art and include hydrolysis by acid or enzyme and oxidation, all of which are commonly employed in the manufacture of thin-boiling starch. The modification of the starch by procedures such as acid hydrolysis or oxidation may be accomplished with or without gelatinization; when enzyme hydrolysis is employed, pregelatinization of the starch is preferred.

Also the amount of borax or sodium pentaborate used depends to some extent upon the degree of modification of the starch, upon the type of starch employed in the process, and the total amount of gelatinized starch contained in the liquid product. Thus, at starch concentrations from about 5 to about 10 percent by weight, the amount of borax used should be at least about 1.8 percent of the total liquid product weight and the amount of sodium pentaborate used should be at least about 3.5 percent of the total liquid product weight, when corn starch or modified corn starch products are used and the amount of borax used should be at least about 0.25 percent and the amount of sodium pentaborate at least about 0.5 percent of the total liquid product weight when waxy grain sorghum starch or modified waxy grain sorghum starch products are used.

The following examples, which are intended as typical and informative only, and not in a limiting sense, will further illustrate the process of this invention. (Methods used to characterize the products obtained will be described hereinafter. Scott test for starch paste viscosity is described in Chemistry and Industry of Starch by R. W. Kerr, 2nd edition, pp. 119–121.)

EXAMPLE 1

Corn starch was treated with sulfuric acid in aqueous slurry (20. Bé.) at 125° F. until a portion of the reaction mixture, when adjusted to pH 5.0 with sodium carbonate and then filtered and washed, showed paste viscosity by Scott test of 50 seconds per 100 ml. when 75 grams of starch was used in 280 ml. of water. The main portion of the starch was then neutralized, filtered and washed. Another batch of corn starch was treated similarly until a portion of the reaction mixture had a paste viscosity by Scott test of 40 seconds per 100 ml. when 28.35 grams of starch was used in 280 ml. of water, after which the main portion of the starch was neutralized, filtered and washed.

In a suitable vessel, 200 grams (commercial moisture basis) of the product prepared above having a paste viscosity by Scott test of 50 seconds per 100 ml. when 75 grams of starch was used in 280 ml. of water, and 133 grams (commercial moisture basis) of the product prepared above with a paste viscosity by Scott test of 40 seconds per 100 ml. when 28.35 grams of starch was used in 280 ml. of water, were dispersed in 1500 ml. of water containing 72 grams of borax. The resultant slurry was heated by conventional means with agitation; the starch was gelatinized and the paste raised to a temperature of 210–212° F. and held in this range for about 15 minutes when heating was stopped. Approximately 1 liter of cold water was then added, followed by minor amounts of a dye color, preservative and a perfume. The dispersion was adjusted to a total weight of 4 kg. with additional water, then agitated, screened and bottled to produce about one gallon of liquid laundry starch.

A portion of the above product was diluted with water and used to size fabrics. A commercially available, well-known brand of liquid laundry starch (commercial product "A") containing sodium chloride was diluted according to directions and used to size fabrics similar to those used above with the product of Example 1. Both sets of garments were divided into two portions, one of which was set aside and the other was dried, sprinkled and ironed following conventional procedures.

Both sets of garments ironed with equal facility and to similar, smooth, pliable finishes. No sticking to the iron or flaking or masking occurred on the cloth sized with the starch product of Example 1. The garments sized with this starch product were as full-bodied as those sized with the commercial product "A."

Standard brand zippers were obtained. These were of conventional make. One zipper was wrapped in contact with the moist fabric set aside from the sizing operation above, in which the Example 1 liquid laundry starch product had been used. This operation was repeated with the fabric sized with commercial product "A." Both sets of fabric containing the zippers were set aside overnight in an atmosphere at 100 percent relative humidity. The next morning, the zippers were removed and the garments were ironed. As those garments sized with commercial product "A" were dried by the passage of the hot iron, a series of brown spots or scorch marks appeared on the fabric, particularly where the fabric had been in direct contact with the zipper. When tension was applied to the fabric near the brown spots, the fabric was easily torn and holes appeared.

Those garments sized with the Example 1 product, when ironed, showed no brown spots, scorch marks or holes, not even at or near that portion of the fabric which had been in direct contact with the zipper.

A portion of the Example 1 product and a portion of commercial product "A" were placed in a refrigerator at a temperature of 0° F. The samples were frozen solid and remained so for a period of 30 days when they were removed, thawed and brought to room temperature slowly. Both samples were then shaken and observed. The Example 1 product was fluid, smooth and contained no lumps or gel particles. When diluted and used to size fabrics, it produced the same excellent results as it had done originally.

However, the thawed commercial product "A," after shaking, did not reconstitute but formed a heterogeneous, grainy, lumpy mass.

*Table I*

SUMMARIZATION OF RESULTS OF EVALUATIONS MADE ON LIQUID STARCH PRODUCTS PREPARED ACCORDING TO THE EXAMPLES CITED AND OF COMMERCIAL LIQUID LAUNDRY STARCH PRODUCTS

| Liquid Starch Product | Rating | | Brown Spot Formation on Fabric | Storage Stability | | Major Nonstarch Ingredient in Liquid Starch Product |
|---|---|---|---|---|---|---|
| | Ironing Characteristics | Stiffening Power | | at 40° F., 6 Months | at 0° F., 1 Month | |
| Example 1 | Good | Good | None | Acceptable | Acceptable | Borax. |
| Example 2 | do | do | do | do | do | Sodium Pentaborate. |
| Example 3 | do | do | do | do | do | Borax. |
| Example 4 | do | do | do | do | do | Do. |
| Example 5 | do | do | do | do | do | Sodium Pentaborate. |
| Example 6 | do | do | do | do | do | Borax. |
| Commercial Product "A" | do | do | Very bad | Not acceptable | Not acceptable | Sodium chloride.ᵃ |
| Commercial Product "B" | do | do | do | do | do | Do.ᵇ |

ᵃ On analysis found to contain about 6 percent of this salt.
ᵇ On analysis found to contain about 3 percent of this salt.

This product, when used to size fabric, had relatively little stiffening power. It caused smears and clots and the iron to stick and drag on the clothing. Also the starch adhered to the sole plate of the iron and was difficulty removed therefrom.

Other portions of the Example 1 product and commercial product "A" were held in a refrigerator at a temperature of 40° F. Periodic observation of the products over a six-month period showed that while commercial product "A" became progressively thicker, more viscous and lumps of clotted starch were formed, the Example 1 product remained smooth, fluid and no lump formation was observed.

Results of the above evaluations are summarized in Table I.

EXAMPLE 2

Example I was repeated excepted that the starches were cooked in water containing 140 grams of sodium pentaborate.

This product was evaluated by procedures similar to that obtained for the product in Example 1. Results of the tests on the Example 2 product are outlined in Table I.

EXAMPLE 3

Corn starch was treated with a solution of alkaline sodium hypochlorite in an aqueous slurry (20° Baume′) at a temperature of 75° F. until a portion of the reaction mixture when adjusted to a pH 6.0 with sulfuric acid, filtered and washed, showed a paste viscosity by Scott test of 40 seconds per 100 ml. when 20 grams of starch was used in 280 ml. of water. The main portion of the starch was then neutralized, filtered and washed.

In a suitable vessel, 333 grams (commercial moisture basis) of the above starch was dispersed in 1500 ml. of water containing 72 grams of borax. The starch was gelatinized, cooled and adjusted to final weight after adjuncts had been added and the final paste screened following a procedure similar to that outlined in Example 1.

This product was evaluated by procedures similar to that outlined for the product in Example 1 except that a commercially available liquid laundry starch product coded commercial product "B" was used. (On analysis, this product was found to contain about 3 percent sodium chloride.) Results are summarized in Table I.

EXAMPLE 4

Waxy grain sorghum starch was treated with an alkaline solution of sodium hypochlorite in an aqueous slurry (20° Baume') at a temperature of 75° F. until a portion of the reaction mixture, when adjusted to pH 6.0 with sulfuric acid, filtered and washed, showed a paste viscosity by Scott test of 100 seconds per 100 ml. when 15 grams of the starch was used in 280 ml. of water. The main portion was then filtered and washed.

The preparation of a finished liquid starch product from this starch was carried out in a fashion similar to the procedure outlined in Example 1 except that the amount of borax used was reduced to 10 grams.

This product was evaluated by the procedures outlined in the previous examples against commercial product "B." Results are summarized in Table I.

EXAMPLE 5

Example 4 was repeated except that the modified waxy grain sorghum starch was cooked in water containing 20 grams of sodium pentaborate.

This product was evaluated by the procedures outlined in the previous examples and results of the tests of this product are summarized in Table I.

EXAMPLE 6

In a suitable vessel, 283.5 grams (commercial moisture basis) of unmodified waxy grain sorghum starch was dispersed in 2500 ml. of water. An aqueous dispersion of "Rhozyme DX" enzyme (supplied by Rohm and Haas Co., Philadelphia, Pennsylvania), which contained, based on starch, 0.3 percent enzyme, was added and the slurry was heated with agitation to a temperature of 210° F. The paste was held in the range of 210°-212° F. and the total weight of the dispersion was adjusted to 3085 grams. Heating and agitation was continued until the paste had a viscosity, by Scott test, of 40 seconds per 100 ml. (based on 28.35 grams starch in 280 ml. of water). A solution containing 8.3 grams of borax was then added and the total weight of the dispersion was adjusted to 3320 grams. Adjuncts such as were used in Example 1 where then added and the product was cooled and screened. The preservative added to prevent the product from spoiling also acts as an enzyme inactivator.

This product was evaluated by the procedures outlined above and results of the tests on the product are summarized in Table I.

I claim:
1. A process for preparing a liquid laundry starch which is stable at temperatures ranging from below freezing to and including normal temperatures which consists of preparing an aqueous slurry of an ungelatinized modified starch selected from the group consisting of oxidized starches and hydrolyzed starches having a pH of at least 5 and a paste viscosity by Scott test not exceeding about 50 seconds per 100 ml. using 75 grams of said starch in 280 ml. of water, and a salt selected from the group consisting of sodium pentaborate and borax, said slurry containing from about 5 to about 10 percent of said modified starch based on the total weight of said slurry, said salt being present in said slurry in an amount of at least about 0.25 percent based on the total weight of said slurry to increase the pH of said slurry to the alkaline range, the pH of said resultant slurry being equal to that which is obtained by adding from 10 to 72 grams of borax to a neutralized dispersion of 333 grams of said starch in 1500 ml. of water, heating said slurry to within the range of 210° to 212° F. until said starch is gelatinized, adding cold water to cool said slurry and provide a stable liquid laundry starch product.

2. A process according to claim 1 wherein said modified starch is a modified corn starch having a paste viscosity by Scott test of about 40 seconds per 100 ml. using 20 grams of starch in 280 ml. of water to about 50 seconds per 100 ml. using 75 grams of starch in 280 ml. of water, and wherein said salt is borax, said borax being present in an amount of at least about 1.8% based on the total weight of said slurry.

3. The process according to claim 1 wherein said modified starch is a modified waxy grain sorghum starch having a paste viscosity by Scott test of about 100 seconds per 100 ml. using 15 grams of starch and 280 ml. of water to about 40 seconds per 100 ml. using 28.35 grams of starch in 280 ml. of water, and wherein said salt is borax, said borax being present in an amount of at least 0.25% based on the total weight of said slurry.

References Cited in the file of this patent

UNITED STATES PATENTS

| | | |
|---|---|---|
| Re. 23,952 | Kerr et al. | Feb. 22, 1955 |
| 2,216,179 | Bauer | Oct. 1, 1940 |
| 2,348,685 | Smith et al. | May 9, 1944 |
| 2,373,016 | Daly et al. | Apr. 3, 1945 |
| 2,796,354 | Fuller | June 18, 1957 |
| 2,819,980 | McCombs et al. | Jan. 14, 1958 |

OTHER REFERENCES

Schopmeyer et al.: "J. Ind. & Eng. Chem.," 35, p. 1172 (1943).

Kerr: "Chemistry and Industry of Starch" (1944), pages 54 and 55.